United States Patent [19]
Barrett

[11] 3,748,470
[45] July 24, 1973

[54] IMAGING SYSTEM UTILIZING SPATIAL CODING

[75] Inventor: Harrison H. Barrett, Lexington, Mass.

[73] Assignee: Raytheon Company, Lexington, Mass.

[22] Filed: Oct. 2, 1970

[21] Appl. No.: 77,459

[52] U.S. Cl. .............................. 250/363, 250/105
[51] Int. Cl. ............................................. G01t 1/20
[58] Field of Search ...................... 250/71.5 S, 105

[56] References Cited
UNITED STATES PATENTS
3,509,341  4/1970  Hindel et al. .................. 250/71.5 S
3,573,458  4/1971  Anger ............................. 250/71.5 S
FOREIGN PATENTS OR APPLICATIONS
42,595  12/1965  Germany ............................ 250/105

Primary Examiner—Archie R. Borchelt
Attorney—Milton D. Bartlett, Joseph D. Pannone, Herbert W. Arnold and David M. Warren

[57] ABSTRACT

An imaging system suitable for use with high energy nuclear particles or photons such as gamma radiation and X-radiation. The system provides means for illuminating an object with radiation as well as spatially coding the illuminating radiation or emitted radiation if the object is self-luminous, to provide a composite image representing the summation of the shadows from all points of the source of illumination. Spatial modulation is accomplished by a mask having a coded pattern of transparent and opaque regions linearly scanned in time. The resulting signal has the characteristics of a chirp waveform typical of pulse compression radars. The composite image is readily decoded by a delay line having a phase or delay characteristic complementary to that of the spatial modulation pattern.

43 Claims, 12 Drawing Figures

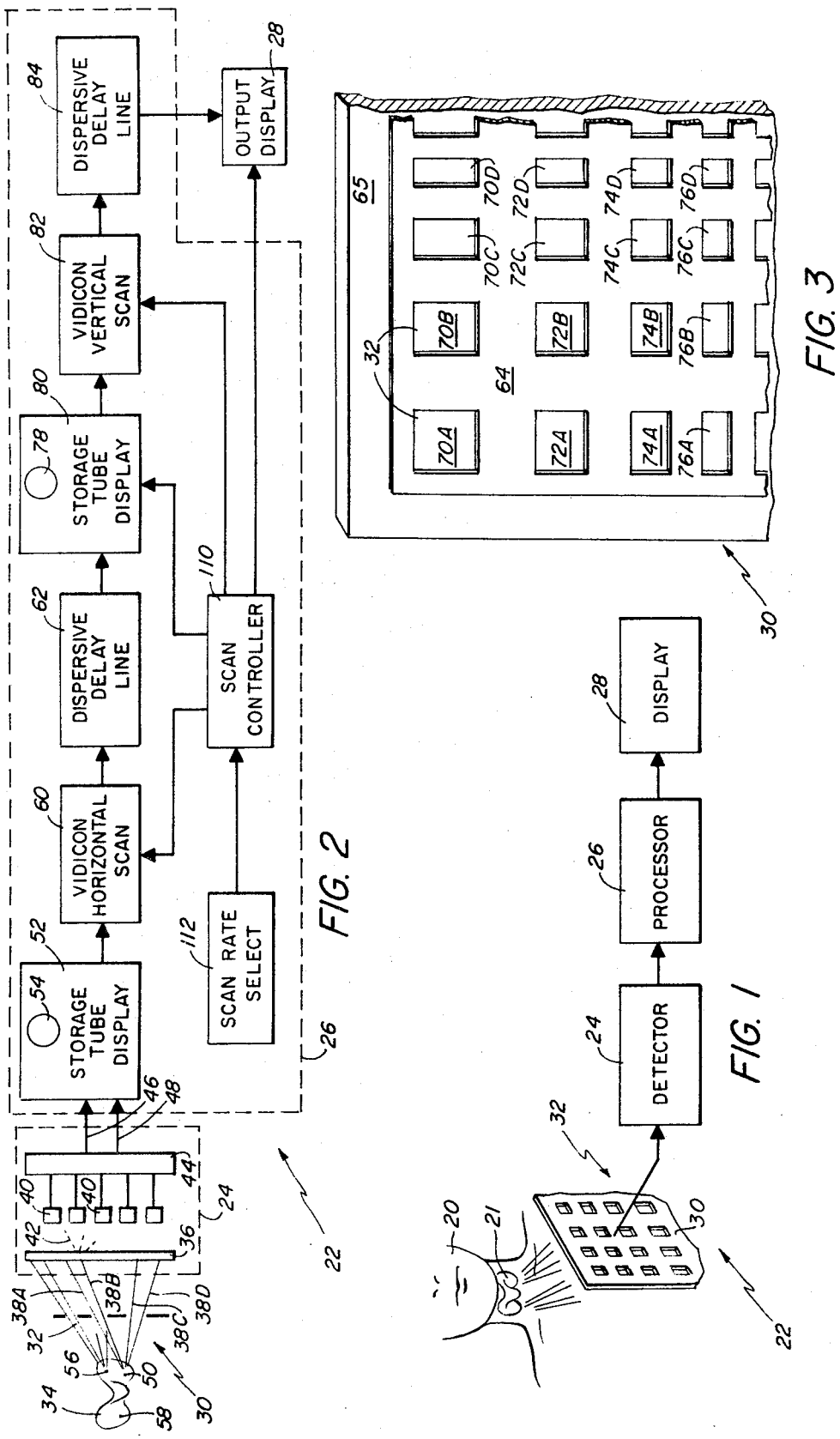

PATENTED JUL 24 1973 3,748,470

IMAGING SYSTEM UTILIZING SPATIAL CODING

BACKGROUND OF THE INVENTION

This invention pertains to the focusing of radiant energy and, more particularly, to radiation characterized by the presence of high energy particles, particularly high energy photons such as in gamma radiation.

In the past, focusing of radiation has been done by lenses where the radiation is of a lower frequency, such as optical radiation, and by means of pinhole cameras or collimator arrays where the radiation if of a higher energy, such as gamma radiation. The pinhole camera has been utilized because the index of refraction at all materials is too small to permit lens construction.

One well-known type of camera for use with gamma radiation imaged by a pinhole or parallel hole collimator array is the Anger camera as disclosed in U.S. Pat. No. 3,011,057, which issued to H. O. Anger on Nov. 28, 1961. While such a camera is in common usage today, its performance is inferior to that of cameras customarily used for optical radiation in that its resolution is substantially lower and its effective aperture, no larger than a pinhole, is far smaller than that of the wide aperture lenses commonly employed in optical cameras today and can be increased at the expense of resolution. Thus, there is a problem as to how to construct a system responsive to high energy radiation which provides real-time imaging of extended objects, such as might appear on a television screen, and variable focusing, for the case where the object-to-camera distance is variable.

SUMMARY OF THE INVENTION

This invention provides wherein an object emitting, or illuminated by, high energy radiation, such as X-radiation, gamma radiation, and nuclear radiation, is observed or imaged by spatially coding the illumination so that there is received a composite image having shaded regions, the shading being due to both the shadows cast by the object itself as well as shadows due to the spatial modulation of the radiation. The shading is the variation over the image plane in the probability of arrival of high energy photons. In one embodiment of the invention, the spatial modulation of the radiation is accomplished by means of a mask or plate having regions which are transparent and regions which are opaque to the radiation. The opaque regions may be regarded as barrier elements which inhibit the passage of particles suchas gamma ray photons and nuclear particles. The invention is particularly useful where the dimensions of the transparent and opaque regions of such marks are, in practical devices, much larger than a wavelength of the radiation which precludes the use of interference or diffraction effects to alter the direction of a ray. In a second embodiment of the invention, the spatial modulation of the radiation is accomplished by illuminating the object by means of a source of radiation comprising emitting areas from which high energy particles emanate which are intespersed among nonemitting areas from which no high energy particles emanate. With both embodiments, the pattern of illuminated and shaded areas has a code or predetermined format.

A detector assembly is positioned to intercept the radiant energy which in the case of gamma radiation comprises a sequence of photons, or quanta of radiant energy. An image of these rays is formed on the face of the detector assembly, the image being scrambled due to the spatial modulation. An image of the object itself is provided by scanning the scrambled image on the face of the detector assembly to provide a scan signal containing information relating to the locations of the various portions of the scrambled image. The scan signal is passed through a filter having a transfer function which is conjugate to the scan signal produced from a point source of radiation through the spatially coded mask, that is, the temporal impulse response function of the filter is the temporal inverse of the scan signal waveform, so that there is a correlation between the filter and the spatial modulation. Thus, for example, where the modulating elements have the form of a series of opaque and transparent regions of successively decreasing size, the scan signal has a form similar to that of a chirped radar signal where the frequency is linearly increasing; and accordingly, in this case the filter would have the form of a pulse compression filter providing differential delays between portions of the signal having differing frequencies. Thus, the image of the radiant energy on the face of the detector assembly would be decoded and compressed into a series of points which are then displayed as the image of the object.

BRIEF DESCRIPTION OF THE DRAWINGS

The aforementioned objects and other features of the invention are explained in the following description taken in connection with the accompanying drawings wherein:

FIG. 1 is a pictorial representation of a system in accordance with the invention for displaying a radiograph of a radioactive object;

FIG. 2 is a block diagram of the imaging system of the invention;

FIG. 3 is a pictorial view of a mask used in the invention;

DESCRIPTION OF THE PREFERRED EMBODIMENT

Referring now to FIG. 1 there is shown a human patient 20 being treated for a thyroid ailment with the aid of equipment responsive to gamma radiation. As is well known, the thyroid gland tends to absorb compounds of iodine which may be injected into the patient or ingested by the patient. To provide a radiograph of a thyroid 21 a radio pharmaceutical containing iodine is administered to the patient. The radioactive molecules of the radiopharmaceutical are then distributed about the thyroid gland and emit gamma radiation, the gamma radiation from each of the molecules forming a part of the radiograph.

Figure 4:
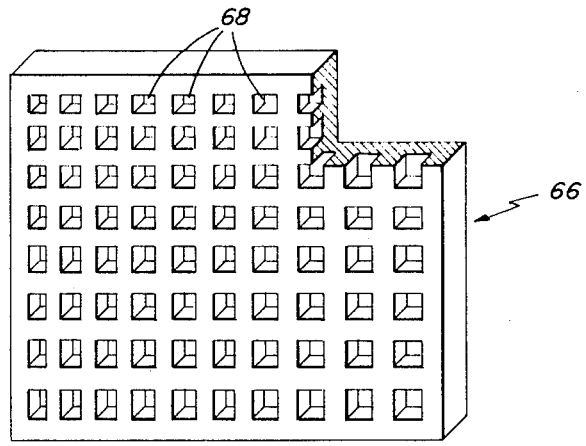
FIG. 4 is a pictorial view of an alternative embodiment of the mask utilized in the invention.

In accordance with the invention a radiograph is formed by means of an imaging system 22 comprising a detector assembly 24 responsive to gamma radiation, a processor 26 for deriving information from each of the high energy photons of the gamma radiation as they impinge on the detector assembly 24, and an output display 28 for showing a radiograph of the thyroid 21. In addition, a mask 30 having an array of apertures of predetermined sizes, indicated generally by the numeral 32, which are arranged in a predetermined manner as will be shown in greater detail hereinafter with reference to FIGS. 3 and 4, is utilized instead of the pinhole aperture or collimator array commonly used for photography of high energy particles. The mask 30 creates a scrambled or coded image at the face of the detector assembly 24 as will be described hereinafter with reference to FIG. 2, and accordingly, the processor 26 incorporates means for decoding the scrambled edge. The mask 30 serves the dual functions of providing increased aperture and permitting a higher resolution than has hithertofore been possible with such large apertures. The larger aperture admits high energy gamma ray photons at a rate far greater than possible with a single pinhole aperture or collimator and thereby reduces the time required to make a radiograph.

Referring now to FIG. 2 there is shown a block diagram of the imaging system 22 of the invention in which an object 34 such as the radioactive thyroid 21 emits radiation in the direction of the mask 30 and detector assembly 24. The detector assembly 24 has a form similar to that of the Anger camera as disclosed in the aforementioned patent to Anger and utilizes a scintillator 36, such as cesium iodide crystal in the form of a plate, which is illuminated by radiation shown as rays 38A-D from the object 34. As is well known, a scintillator emits light from the point of impact of a high energy particle which may be a high energy photon from gamma radiation or X-radiation as well as an impact from a nuclear particle such as a proton or a neutron. An array of detector elements 40 are arranged to intercept the light, for example the light rays 42 emitted from the sites of such impacts on the scintillator 36. As disclosed in the aforementioned patent to Anger the detector elements 40 are connected to a matrix 44 of resistors which provide the X and Y coordinates. Currents are induced in the resistors (not shown) proportional to the intensity of the light received at the respective detector elements 40. Since the intensity of light impinging upon any one of the detector elements 40 is related to the angle of arrival of the light rays 42 from a point of impact on the scintillator 36 to a detector element 40, the currents in the resistor matrix 44 are related to the location of the point of impact on the scintillator 36. Thus, the resistor matrix 44 is able to provide the X and Y coordinates of the impact location as shown on lines 46 and 48. Since the detector assembly 24 is responsive to nuclear particles as well as high energy photons, the imaging system 22 can form a radiograph of an object radiating high energy in the form of nuclear particles as well as high energy photons.

The operation of the imaging system 22 is readily distinguished from well known optical imaging systems which commonly employ reflecting surfaces or lenses to produce images. In the case of a lens used in such optical systems the index of refraction of the material used in the lens varies with frequency and approaches unity for the higher radiation frequencies as are found in X-radiation and gamma radiation as well as for nuclear particles. Thus, in high energy radiation imaging systems the use of optical lenses is precluded in that there is insufficient index of refraction to bend the rays of radiation to form an image. And similarly with the reflecting surfaces of mirrors used in optical systems, at the higher energy radiation, such as X-radiation and particularly gamma radiation and nuclear radiation, the reflecting surfaces tend to be no longer reflecting and such radiation proceeds to travel straight through the material used in the reflecting surface.

The mask 30 and the detector assembly 24 do not use the focusing effect associated wit the bending of rays of radiation as is done in the typical optical system. The image formed on the scintillator 36 is produced by techniques of geometric optics analogous to that of the pinhole camera in which all rays of radiation are straight. Accordingly, the operation of the mask 30 is to be distinguished from that of defraction gratings in optical systems of the prior art.

The operation of the mask 30 can be explained as follows. Consider a point source such as source 50 of high energy radiation located on the object 34. The source 50 emits quanta of radiation, either a photon or nuclear particle, which travls from the object 34 to the mask 30. The quanta of energy passes through the mask 30 in the event that it is emitted in a direction towards an aperture 32, or is stopped by the mask 30 in the event that it is emitted in a direction towards an opaque section of the mask. The source 50 emits the quanta of energy sequentially and at irregular intervals. If the scintillator 36 were to have a very long persistence time compared to the mean interval between the emitted quanta of radiant energy then it would be observed that an image or shadow of the mask 30 would gradually appear on the scintillator 36 as successive quanta of radiation passed through the apertures 32 to impact upon the scintillator 36.

As a practical matter, cesium iodide scintillators do not have sufficient persistence time for forming an image when illuminated by an object such as the radioactive thyroid 21. Accordingly, the X-Y coordinate position data of each of the impact points must be processed in a manner which preserves the data of the individual impact points until such time as there are a sufficient number of these points to provdie a usable image. Thus, for example, the X-Y coordinate data on lines 46 and 48 could be processed by a computer (not shown) which provides a memory address code for each of the impact points, or as is shown in the preferred embodiment of FIG. 2 the processor 26 utilizes a first storage tube display 52 responsive to the X-Y coordinate data on lines 46 and 48. The first storage tube display 52 has a cathode ray tube (not shown) with a long persistence storage screen, hereinafter referred to as the first storage screen 54, which as is well known, emits light in response to the impact of electrons from the electron gun of the cathode ray tube. The details of the first storage tube display 52 are not shown since they are well known. The first storage tube display 52 additionally contains a circuit responsive to the presence of the electrical signals on lines 46 and 48 for energizing the beam of the cathode ray tube to illuminate the first storage screen 54 at the point corresponding to the X and Y coordinates. In this way the sequential impact of quanta of radiant energy from the source 50 upon the scintillator 36 are transformed into an image on the first storage screen 54, the image having the form of the shadow of the mask 30 corresponding to illumination of the mask 30 from the point source 50. Since a radioactive object such as the radioactive thyroid 21 has many points which serve as sources of radiation, each such point being a small volume of radioactive material, a multiplicity of images are formed and superposed on the first storage screen 54 in response to illumination of the mask by each of these sources such as the sources 50, 56 and 58. It is thus apparent that the image appearing on the first storage screen 54 is in fact a scrambled or coded image of the object 34 since it bears little, if any, resemblance to the object 34 and yet contains all the information as to form the object 34. The next step in forming a radiograph of the object 34 is therefore the unscrambling or decoding of the image on the first storage screen 54.

The decoding of the scrambled image on the first storage screen 54 can be done, for example, by a computer (not shown) which processes the X-Y coordinate data in accordance with programs utilizing the mathematics of convolution and Fourier transform operations, or as is shown in the preferred embodiment of FIG. 2, by means of scanning technique which utilizes the matched filter or pulse compression technique of radar systems. The processor 26 unscrambles the image in a two-step procedure in which it first unscrambles the image in the horizontal dimension and then unscrambles the image in the vertical dimension.

The first step in the decoding is accomplished by means of a first vidicon 60 and a first delay line 62. The first vidicon 60 horizontally scans the first storage screen 54 and provides an output signal consisting of successive horizontal line scans. The first vidicon 60 utilizes a linear sweep rate when scanning storage tube screens that are flat; a nonlinear sweep rate is utilized for curved storage tube screens in order to cancel the effect of the curvature so that the output signal from the first vidicon 60 has the characteristics of a linear scan. The waveform of the signal provided by each line scan of the first vidicon 60 corresponds to the shadow cast upon the scintillator 36 and is readily visualized in the case of illumination of the mask 30 by a single source of high energy radiation such as the source 50.

The shadow cast by the mask upon the scintillator 36 comprises a succession of light and dark areas as can be visualized by examining the axonometric view of the mask 30 as shown in FIG. 3 as well as the diagrammatic sectional view taken through a line of apertures 32 as shown by the mask 30 of FIG. 2. The mask 30 comprises an array of apertures 32 of relatively transparent areas formed within a base material such as lead which is relatively opaque to high energy radiation, the opaque portion being designated by numeral 64. Since the opaque portion 64 is a relatively thin film in the case of X-radiation or gamma radiation, the opaque portion 64 is supported by a rigid substrate 65 of relatively transparent material such as a material of low atomic number, for example, aluminum.

In an alternative embodiment of the mask indicated by numeral 66 and shown partially cut away in FIG. 4, apertures 68 do not pass completely through the base material so that there is a small amount of opacity even in the relatively transparent region of the mask 66. The embodiment of FIG. 4 represents one method of reducing the effect of radiation resulting from Compton scattering within the object 34 of FIG. 2 since, as is well known, the radiation resulting from the Compton scattering is of a lower energy than the direct radiation from the soruce 50. Accordingly, the mask 66 shown in FIG. 4 can provide an image on the first storage screen 54 having greater definition than does the mask 30 of FIG. 3. With either the embodiment of the mask as shown in FIG. 3 or that shown in FIG. 4 substantially the same shadow pattern is developed by the mask on the scintillator 36 in response to radiation emanating from the source 50.

Referring again to FIGS. 2 and 3 the configuration of the apertures 32 and their arrangement may be readily explained by considering an aperture array of one dimension such as the row of apertures 70A-D. For ease of reference in this description of the aperture arrangement, each of the apertures 32 are further designated by individual numerals followed by letters, the numeral indicating the row position and the letter indicating the column position. The row of apertures 70A-D are configured and arranged so that when the image of the row of apertures 70A-D on te first storage screen 54 is scanned, a chirp waveform similar to that utilized in a pulse compression radar system appears on the output signal on the first vidicon 60.

Recalling that a linear scan is utilized by the first vidicon 60, the output signal of the first vidicon 60 has the form of a square wave in which the period of the square wave is linearly increasing with time or linearly decreasing with time. The first delay line 62 to which the signal is applied is responsive to the repetition frequency of the square wave, so that for purpose of this analysis the higher order harmonics of the square wave can be disregarded. Therefore, the chirped square wave may be regarded as a chirped sine wave having a frequency which is linearly increasing with time as the image of the apertures 70A-D is scanned in the direction from aperture 70A to aperture 70D, the instantaneous frequency of the chirped sign wave being linearly decreasing in time when the image of the apertures 70A-D is scanned in the direction from aperture 70D toward aperture 70A. As shown in FIG. 3 the dimensions of contiguous opaque and transparent regions of the mask differ only slightly in the direction of scanning, with the spacings between the respective apertures 70A-D decreasing linearly as do the widths of the apertures 70A-D.

In the dimension perpendicular to the direction of scanning, which for ease of reference may be referred to as the height of the apertures, is uniform form along the row of apertures 70A-D. The height of the apertures in the next row of apertures, namely the height of the apertures 72A-D is also of uniform magnitude along the row of apertures 72A-D, but is smaller than the height of the apertures in the row of apertures 70A-D. The heights of the successive rows of and the spacings between the successive rows decreases linearly so that the height of the row of apertures 74A-D is smaller than that of the row of apertures 72A–D, and similarly the height of the row of apertures 76A–D is smaller than that of the row of apertures 74A–D. In this way a vertical scanning of the image or shadow of the mask 30 results similarly in a chirped waveform.

Returning now to FIG. 2 the horizontal scanning of the first storage screen 54 by the first vidicon 60 results in a chirped waveform for the reasons described hereinabove with reference to FIG. 3. The chirped wave of the first vidicon 60 is applied to the first delay line 62 which is frequency dispersive and furthermore has a phase or time delay characteristic which is the inverse (or the mirror image) of the chirped square wave. Signals of different frequencies experience different time delays in progressing through the first delay line 62. The first vidicon 60 together with the first delay line 62 may be regarded as a transmission medium through which portions of the image on the first storage screen 54 are sequentially transmitted, the medium being characterized by a differential delay imparted to the various portions of the image. As is well known from the theory of matched filters and the pulse compression filters utilized in radar systems (for example, see the article entitled "The Theory and Design of Chirp Radars" by J.R. Klauder, A.C. Price, S. Darlington and W. J. Albersheim in the Bell System Technical Journal of July 1960, Volume 39, pages 745–808), a filter having an impulse response which is the inverse of the time waveform of the input signal applied to the filter provides an output signal in the form of a narrow pulse. In the case of a wide bandwidth input signal, such as the chirped waveform of the imaging system 22, the output signal of such a filter approximates an impulse. Accordingly, the output signal of the first delay line 62, assuming the mask 30 to be illuminated by the single source 50, may be regarded as an impulse which corresponds to the position of the source 50. The impulse is displayed on the screen 78 of a second storage tube display 80. The position of the displayed impulse on the second storage screen 78 is in response to the location of the source 50 relative to the mask 30 and the detector assembly 24. Thus, the imaging system 22 can show the direction to a source of high energy particles.

If the mask 30 were illuminated by high energy radiation from the source 56 which is spaced apart from the source 50, the resulting image on the first storage screen 54 would differ from the image obtained by illumination of the mask by source 50. The chirped wave form signal being produced by the first vidicon 60 in response to the scanning of the image produced by the source 56 differs from that associated with source 50 in that the occurrence of a particular instantaneous value of pulse repetition frequency is attained at a different instant of time relative to the interval of scanning by the first vidicon 60. Accordingly, the output pulse from the first delay line 62 corresponding to illumination by source 56 occurs at a different time relative to the scanning interval of the first vidicon 60 than would the output pulse corresponding to the illumination by the source 50. Thus the display on the second storage screen 78 shows a point representing the location of source 56 at a location which differs from that of the image point which represented the location of the source 50.

The imaging system 22 is linear and accordingly superposition applies so that illumination of the mask 30 by both sources 50 and 56 produces an image on the first storage screen 54 which has the form of the superposition of the two individual images resulting from illumination by source 50 and source 56. Similarly, the output signal of the first vidicon 60 attained upon a scanning of the first storage screen 54 is the superposition of two chirp waveforms. The first delay line 62 responds to the superposition of the two chirped waveforms in the same manner that it responds to each of the waveforms individually and accordingly provides two output pulses corresponding in time to the locations of the sources 50 and 56. Thus, there appears on the second storage screen 78 two image points corresponding to the locations of the sources 50 and 56. By an extension of the superposition principle it becomes apparent that with a multiplicity of sources of high energy radiation in the object 34, such as for example, the individual radioactive molecules of the radio pharmaceutical within the thyroid gland 21, a multiplicity of image points appear on the second storage screen 78, each of these points corresponding to the locations of the individual sources of the high energy radiation in the object 34. Thus, there appears on the second storage screen 78 a partially unscrambled image of the object 34, the image being unscrambled in the horizontal direction due to the decoding by the first vidicon 60 and first delay line 62 but still being scrambled in the vertical dimension.

The second step in the decoding of the image of the mask 30 is performed by the second vidicon 82 and the second delay line 84. The second vidicon 82 scans the image on the second storage screen 78 in the vertical direction and provides a corresponding chirp waveform which is applied to the second delay line 84. The second delay line 84 operates in the same manner as does the first delay line 62 and, accordingly, it responds to the chirp waveform signal from the second vidicon 82 by providing a set of output pulses corresponding to the locations in the vertical plane of the sources of high energy radiation of the object 34. The output pulses of the second delay line 84 are transmitted to the output display 28 which shows a fully unscrambled or decoded image of the object 34. Thus, it is seen that the first vidicon 60 and the first delay line 62 resolve the locations of the sources such as the sources 50, 56 and 58 in the horizontal direction wile the second vidicon 82 and second delay line 84 resolve the locations of the sources 50, 56 and 58 in the vertical direction.

Figure 5:
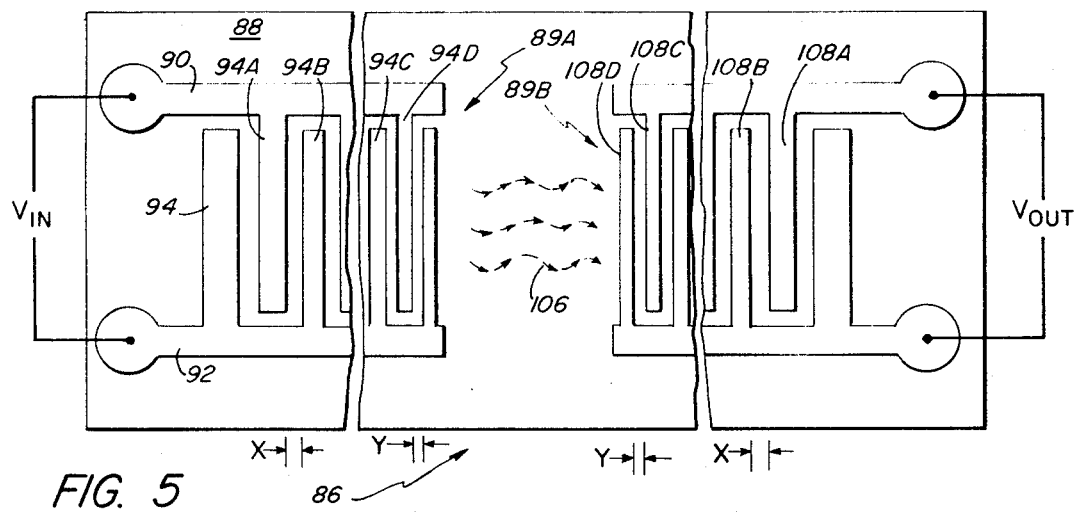
FIG. 5 is a plane view of a dispersive surface wave delay line showing a variation in the spacing of fingers in a comb structure.
Figure 6:
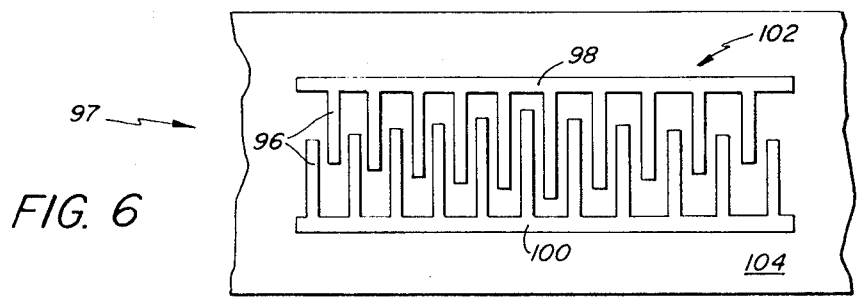
FIG. 6 is a plane view of a portion of a surface wave delay line showing a variation in the overlapping of the fingers in an interdigital network.

Referring now to FIGS. 5 and 6 there are shown two plan views of delay lines. In the preferred embodiment of FIG. 2, the first delay line 62 and the second delay line 84 are identical since the mask 30 of FIG. 3 has the same condiguration and arrangement of apertures 32 in both the rows and the columns. Accordingly, FIGS. 5 and 6 are equally applicable to both the first delay line 62 and the second delay line 84. The delay line 86 of FIG. 5 comprises an elongated piezoelectric crystal 88 upon which is mounted a pair of interdigital electrical networks, one interdigital network 89A serving as the input for generating surface acoustic waves on the crystal 88 and a seond interdigital network 89B located at the output end of the crystal 88 for extracting an electrical signal from the crystal 88. The input interdigital network 89A comprises a pair of opposed interlaced combs 90 and 92 having fingers 94, four of which are designated 94A–D, which are spaced in accordance with a predetermined format. In addition, the length of the fingers 94 may be varied in a prescribed format as shown with the fingers 96 of delay line 95 in FIG. 6. The varying degrees of overlapping between the fingers 96 of the opposed combs 98 and 100 provide varying degrees of coupling of energy between the interdigital network 102 and the crystal 104. The design of a delay line such as the delay line 86 is described in the U.S. Pat. to J.H. Rowen No. 3,289,114 which issued on Nov. 29, 1966, and in an article entitled "Tapping Microwave Acoustics for Better Signal Processing" by L. Altman, J.H. Collins and P.J. Hagon which appeared in Electronics p. 94 et seq. Nov. 10, 1969.

The input terminals to the delay line 86 comprise extensions of the pair of combs 90 and 92. An input electrical signal having a voltage $V_{IN}$ is applied across the two terminals. The fingers 94A and 94B are spaced apart a distance X while the fingers 94C and 94D are spaced apart by a distance Y. The electrical energy in the input signal is coupled into the crystal 88 and transformed into mechanical energy of the crystal 88 at a first frequency dependent on the spacing X and at a second frequency dependent on the spacing Y. The mechanical energy is indicated at a wave 106 shown by a series of wavey arrows. Thus, energy is coupled at the first frequency between fingers 94A, 94B and the crystal 88, and at the second frequency between the fingers 94C, 94D and the crystal 88.

The reverse mechanism mainly the conversion of the mechanical energy of the crystal 88 into electrical energy occurs at the output end of the delay line 86. In the output interdigital network 89B there are also a pair of fingers spaced at a distance X, namely, fingers 108A and 108B, and similarly there are also a pair of fingers spaced at a distance Y, namely, fingers 108C and 108D. Mechanical energy at the first frequency is coupled out from the crystal 88 by means of fingers 108A and 108B, and that at the second frequency by means of the fingers 108C and 108D. The delay line 86 is made dispersive to provide different delays at different frequencies by arranging the input and output interdigital networks 89A and 89B such that they are the mirror images of each other with respect to the centerline of the crystal. Thus, for example, the two spacings of distance X are symmetrically located relative to the centerline of the crystal 88 and similarly the two spacings of distance Y are symmetrically located relative to the centerline of the crystal 88, however the spacings of distance X are further away from the centerline than the spacings of distance Y. As a result, energy at the first frequency traverses a greater portion of the crystal 88 than does energy of the second frequency, and consequently experiences a greater delay. Thus where the signal voltage $V_{IN}$ is a chirped signal in which the instantaneous frequency is increasing, the energy at which of these frequencies is selectively delayed with the result that substantially all of the energy appears at the output terminals at the same instant of time. Thus, the output voltage $V_{OUT}$ is a pulse of energy approximating an impulse.

The delay line 86 is commonly referred to as a surface wave delay line since accoustic energy in the form of mechanical vibrations travel along the surface of the crystal as indicated by the wave 106. The delay line 86 can be designed to approximate various filter characteristics by adjusting the amount of overlap between adjacent fingers of opposed combs as shown by fingers 96 of in FIG. 6. For example, if it is desired to pass energy at one frequency but attentuate energy at a second frequency than a relatively large amount of overlap is provided for the first frequency and a minimal amount of overlap is provided at the second frequency. In this way a relatively large amount of energy is coupled at the first frequency and passes through the delay line 86 while a minimal amount of energy is coupled at the second frequency resulting in attenuation at that frequency.

Returning again to FIG. 2 a scan controller 110 coordinates the scannings of the first and second vidicons 60 and 82, the second storage tube display 80 and the output display 28 so that each of these scannings occur with the correct temporal relationship. Accordingly, in the operation of the second storage tube display 80 the successive horizon deflections of the cathode-ray-tube beam are delayed from the corresponding horizontal line scans of the first vidicon 60 by an amount of time equal to the minimum time delay of the first delay line 62, that is, the amount of time required for energy to first appear at the output of the first delay line 62 in response to a signal from the first vidicon 60. the scanning of the second vidicon 82 is delayed until the full image has been composed upon the second storage screen 78. The operations of the output display 28 and of the second vidicon 82 are delayed by an amount equal to the minimum delay time of the second delay line 84. The aforesaid temporal relationships among the various scannings assure that the images provided on the various displays are appropriately centered relative to the display. It is also apparent that, alternatively, the horizontal and vertical scanning procedures may be interchanged such that the image on the first storage screen 54 is vertically scanned while the image on the second storage screen 78 is horizontally scanned.

By way of alternative embodiments it is noted that the first storage tube display 52 and the first vidicon 60 could be replaced by a single well-known scan converter tube (not shown) comprising read and write electron beams and a storage screen if the persistence of the storage screen is sufficient to permit the development of the image of the mask 30 during the successive impacts of quanta of radiant energy upon the scintillator 36. The use of scan converter tubes is well known and is not shown in the figures. Similarly, the second storage tube display 78 and the second vidicon 82 may be replaced with a single scan converter tube.

Focusing of the imaging system 22 of FIG. 2 to provide the desired spacings between the object 34, the mask 30 and the detector assembly 24 is accomplished as follows. The object 34, mask 30 and detector assembly 24 are spaced apart such that the shadow or image of the mask 30 due to illumination by a single source of the high energy radiation is smaller than the scintillator 36. Thereby, each of the shadows of mask 30 corresponding to illumination by successive sources, such as sources 50, 56 and 58, fall wholly within the area of the scintillator 36. If the size of the mask 30 approximates that of the scintillator 36 than it is apparent that the shadow due to illumination by source 58 may lie wholly within the area of the scintillator 36 while the shadow due to illumination by source 50 has its upper edge outside the area of the scintillator while the shadow due to illumination by source 56 has its lower edge outside the area of the scintillator. As a result with an overly large mask not all of the sources such as the sources 50 and 56 receive the full benefit of the mask 30 during the formation of the images of these sources by the imaging system 22. On the other hand, a large mask permits increased resolution in that a greater range of aperture sizes may be formed within the mask.

The spatial bandwidth, and hence, the resolution attainable with the imaging system 22 is determined by the difference between the smallest aperture size and the largest aperture size of the mask 30. A large number of apertures 32 are utilized to insure small gradations in size between adjacent apertures, therby providing a smooth transition in the spatial frequency domain from the lowest spacial frequency to the highest spatial frequency and, thereby further providing output signals from the first and the second vidicons 60 and 82 which have a smooth spectral distribution. As a result, the delay lines 62 and 84, having temporal impulse response functions which are the inverse of the vidicon output signals, function as pulse compression filters providing minimal side lobes. If the spatial bandwidth is retained but the number of apertures 32 in the mask 30 is decreased, that is there are larger jumps in size between adjacent apertures 32, then the extent of the side lobes in the output signals from the delay lines 62 and 84 increases. Therefore, it is seen that it is desirable to use a large mask yet retain a sufficiently small size such that all the sources of the high energy radiation provide shadows which fall within the area of the scintillator 36. It is convenient to regard the field of view of the imaging system 22 as being the maximum spacings between sources of the high energy radiation such that there is no reduction in the attainable resolution due to an extension of a shadow of the mask 30 beyond the area of the scintillator 36.

Another advantage of a large mask is the increased aperture of the imaging system 22 due to the fact that more rays of radiant energy are intercepted by the mask 30 and processed. A larger aperture means decreased viewing time so that, in the case of the patient 20 of FIG. 1 being treated for a thyroid ailment, less exposure time is required to obtain the radiograph of the thyroid gland 21. In particular, it is noted that the mask 30 provides a greater aperture or efficiency than does either the pin hole version of the Anger camera or the collimator version of the Anger camera, both disclosed in the aforementioned patent to Anger. As compared to the pinhole camera, the imaging system 22 attains a greater efficiency because there is a larger total aperture due to the summation of all the apertures 32 in the mask 30; and with reference to the collimator version of the Anger camera, the imaging system 22 attains a greater efficiency due to the fact that a relatively large number of high energy photons strike the septal separations within the collimator so that only those photons directed in a direction parallel to the collimator axis reach the scintillator.

For precise focusing of the imaging system 22 on the object 34, a predetermined scan rate provided by rate selector 112 is applied by means of the scan controller 110 to the first vidicon 60, the scan rate being selected so that the image of a point source on the first storage screen 54 is scanned in a time interval of a preset value independently of the size of this image. It is readily apparent that the dimensions of this image are proportional to the dimensions of the mask 30 and, furthermore, related to the distance from the object 34 to the mask 30 and from the mask 30 to the scintillator 36. For example, with reference to the patient 20 of FIG. 1, if the patient were to move away from the imaging system 22, then the image formed upon the first storage screen 54 would become smaller. If the scan rate applied by the scan selector 112 were to remain at a preset value, then it is apparent that the image, due to its reduced size, would be scanned in a correspondingly reduced interval of time with the result that the frequency components occurring in the output signal of the first vidicon 60 would be scaled to a correspondingly higher value which may be greater than that for which the first delay line 62 has been designed. To compensate for this motion of the patient 20 of FIG. 1, either the mask 30 is to be repositioned further away from the detector assembly 24 by suitable means (not shown) thereby restoring the image on the first storage screen 54 to its original size, or alternatively, by reducing the scan rate applied by the scan selector 112 so that the reduced size image is scanned in a time interval having the preset value. Since the field of view of the imaging system 22 is dependent on the relative distances from the object 34 to the mask 30 and from the mask 30 to the scintillator 36, it is preferable to adjust the focusing by means of the scan rate applied by the scan controller 110 to the first vidicon 60.

The following relationships, indicated mathematically, are useful in the design of the imaging system 22. The compression ratio resulting from the use of the chirped signal from the first vidicon 60 and the conjugate time delay characterlstic of the first delay line 62 may be expressed as the ratio of the width of an image on the first storage screen 54, corresponding to a point source of radiation, to the width of the mask 30. The compression ratio C is given by $$C = 1_a BW_s$$

where $1_a$ is the width of the mask 30 and $BW_s$ is the spatial frequency bandwidth which is given as the difference between the minimum and the maximum spatial frequencies of the mask pattern. For example, a uniform arrangement of 10 equal apertures within a distance of 1 inch would give a spatial frequency spectrum described by a single line of value 10 line-pairs per inch. As a further example consider a mask having a chirped pattern in which the apertures are spaced at a rate of 200 apertures per inch near one edge of the mask and at a rate of 100 apertures per inch near the opposite edge of the mask. In this example, the spatial frequency bandwidth is 100 line-pairs per inch.

The field of view mentioned hereinabove is given in the following equation:

$$F_V = (s_1/s_2)(1_i - 1_a) - 1_a$$

where $F_V$ is the field of view, $s_1$ is the distance between the object and the mask, $s_2$ is the distance between the mask and the image plane at the face of the scintillator 36, and $1_i$ is the length of the image plane at the scintillator 36.

The resolution in line-pairs per inch is given by $$R_o = BW_F R_i s_2/2s_1$$

where $R_o$ is the resolution in the horizontal dimension of the image on the first storage screen 54 in line-pairs per inch, $BW_F$ is the fractional bandwidth of the first delay line 62 which is the bandwidth of the delay line divided by the maximum frequency of the delay line, and $R_i$ is the minimum resolution of the scintillator 36 which depends on such factors as the thickness of the scintillator 36.

By way of example in constructing the preferred embodiment of the imaging system 22, the first and the second delay lines 62 and 84 are each operated over a frequency of from 2.8 megahertz to 4 megahertz, and are fabricated from a quartz crystal 8½ inches in length; each of the interdigital networks 89A and 89B comprise a pair of opposed combs, each comb having approximately 100 fingers. The mask 30 in the case of X- radiation is a thin lead film of approximately 3 microns ($3 \times 10^{-6}$ meters) in depth. The transparent substrate 65 (seen in FIG. 3) for supporting the thin film is fabricated from a ⅛ inch thick plate of aluminum. For gamma radiation at a energy of 100 Kev the thickness of the lead film is approximately ½ millimeter. The mask 30 has a square shape, each side being 2 inches long. There are 100 apertures along a side giving a total number of apertures of 10,000.

The number of apertures that can be placed upon a 2 inch square mask is limited by the thickness of the mask, since it is desired to provide an aperture size which is much greater than the depth of the mask to avoid producing a structure similar to the collimator shown in the aforementioned patent to Anger. As shown in FIG. 2 the rays of radiation indicated by the lines 38A–D fan out from the source 50 through the apertures in the mask 30 to illuminate the scintillator 36; such illumination of the scintillator 36, namely, by diverging rays, would be precluded by the collimator structure shown in the aforementioned patent to Anger.

The size of the mask 30 is smaller than the size of the scintillator 36 for reasons which can be readily appreciated by the following example. If the scintillator 36 were to have a width of 4 inches and the mask were to have a width of 2 inches, then for an equal spacing of the mask between the object 34 and the scintillator 36 a point source on the object 34 could completely illuminate the scintillator 36 with an image or shadow of the mask 30. Then, if a second source were positioned alongside the first source to illuminate the scintillator 36, the shadow cast by the mask 30 due to the second source would not fall wholly upon the scintillator 36. In view of the equations given above for the field of view and the resolution, it is apparent that the imaging is more readily accomplished if the mask size is less than half the size of the scintillator 36. For example, a 2 inch mask and an 8 inch or 10 inch scintillator may be utilized.

Figure 7:
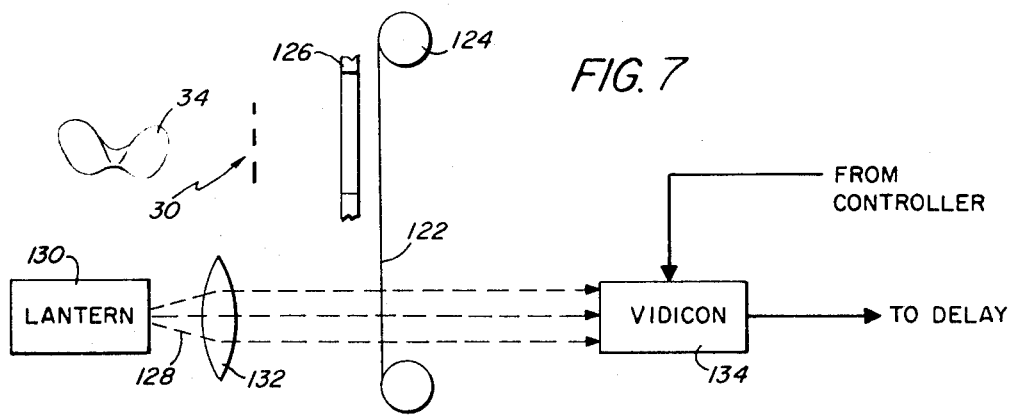
FIG. 7 is an alternative embodiment of the imaging system of the invention.

Referring now to FIG. 7 there is shown an alternative embodiment of the imaging system which may be utilized for providing a radiograph of the object 34. The radiation from object 34 passes through the apertures in the mask 30 to impinge upon a photographic film 122 carried by a reel assembly 124. An aperture stop 126 delineates the boundaries of the image formed upon the film 122. In this embodiment the radiograph is a negative rather than the positive provided in FIG. 2. The film 122 is developed by any suitable means (not shown) so that the image on the film can be illuminated by a light beam. A beam of light 128 is provided by lantern 130 and collimated by lens 132 to illuminate the image on the film 122 which has been formed in response to radiation passing through the mask 30. In this embodiment the film serves as both the detector assembly 24 and the first storage tube display 52 of the embodiment of FIG. 2. The remaining portions of the embodiment of FIG. 7, such as the vidicon 134, which corresponds to the first vidicon 60 of FIG. 2 are the same as those shown in FIG. 2.

Figure 8:
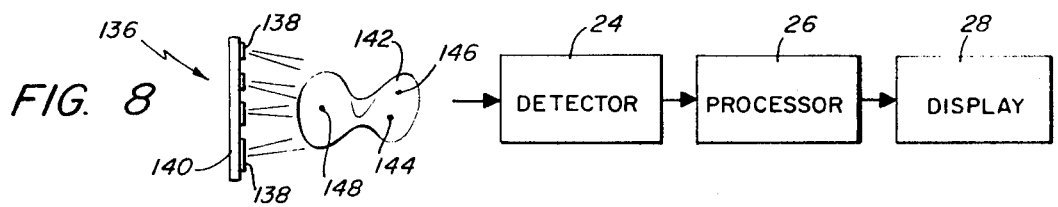
FIG. 8 is a further embodiment of the invention wherein a large spatial frequency bandwidth is provided by a source of radiation.
Figure 9:
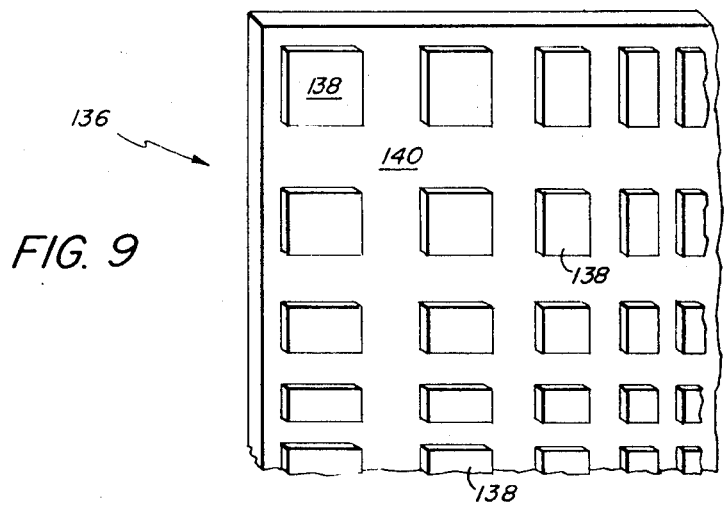
FIG. 9 is a detailed view of a source of radiation providing a large spatial bandwidth in accordance with the invention.

Referring now to FIGS. 8 and 9 there is shown an alternative embodiment of the invention wherein the spatial modulation of the high energy radiation which was provided by the mask 30 of FIG. 2 is now provided by a source of radiation 136 which comprises a novel arrangement of emissive material such as radioactive material 138 deposited on a substrate 140 and selectively etched to provide areas of radiation having the same shape and configuration as the apertrues 32 of the mask 30 of FIGS. 2 and 3. The object 142 is partially opaque so that points of the object 142 such as the points 144, 146 and 148 are illuminated by the source of radiation 136 to form an image upon the detector assembly 24. The detector assembly 24, processor 26 and output display 28 shown in FIG. 8 are the same as those utilized in FIG. 2. In FIG. 2 each point source, such as the source 50, is transformed to a shadow of the mask 30 at the detector assembly 24. Analogously, in FIG. 8 each point of the object 142 is transformed into an image at the detector assembly 24, the image depending on the form of the pattern of radioactive material 138 deposited upon the substrate 140 of the source 136.

Figure 10:
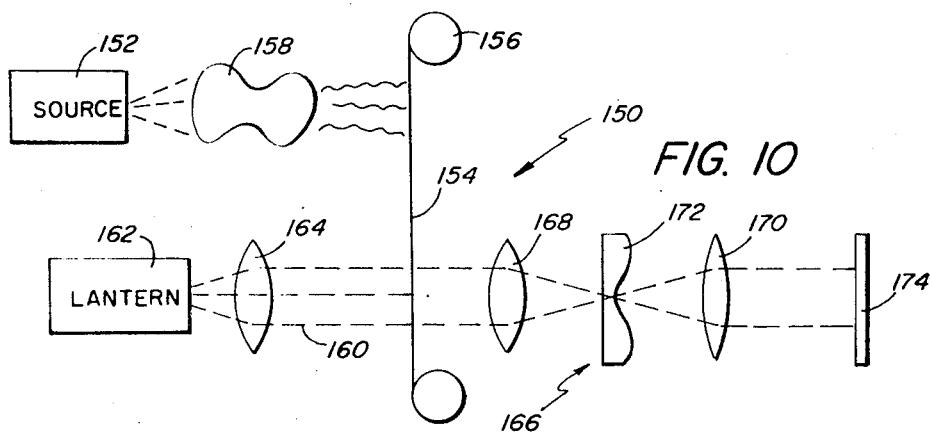
FIG. 10 is a diagrammatic view of a radiographic system employing spatial filtering of an image formed with the aid of the source of FIG. 9.

Referring now to FIG. 10 there is an X-ray radiographic system 150 utilizing a source 152 of X-rays to be described hereinafter, a photographic film 154 carried by a reel assembly 156, and an object 158 to be illuminated by the source 152 for forming an image on the film 154. After forming the image on the film 154 the film is developed by any suitable means (not shown) and positioned such that the image falls within a beam of light 160 formed by a lantern 162 and collimating lens 164 for processing by the optical system 166. The optical system 166 is of a well known form and is often used for extracting information from a radiograph. The optical system 166 comprises a pair of lenses 168 and 170 with a spatial optical filter 172 placed between the lenses, and a screen 174 upon which a filtered manifestation of the image appears. As is well known spatial filtering is used in a manner analogously to the filtering of time domain signals to extract those portions of the signal having a desired frequency characteristic and suppressing other portions of the signal having other frequency characteristics. The spatial filter 172 has portions of varying opacity to inhibit the passage of selected spacial frequencies. In this way certain features of a radiograph are made more readily visible.

Of particular interest is the fact that a broad band optical signal can produce greater definition in a radiograph when proper filtering is employed. A point source of high energy radiation provides a relatively large spatial bandwidth. On the other hand a relatively large source provides a relatively narrow spatial bandwidth. As is well known, the sources of radiation which most closely approximate the point source and therefore have the largest spatial bandwidth provide a radiograph with the best definition or, equivalently, the clearest picture. The use of the novel source 136 (of FIG. 9) of this invention as the source 152 in the radiographic system 150 of FIG. 10 provides radiation having a large spatial bandwidth, the extent of the bandwidth being directly related to the number of radiant regions (such as the regions of radioactive material 138) per unit area and their configuration. In particular, the source as shown in FIG. 9 provides a chirp wave form bandwidth characteristic analagous to that obtained by use of the mask 30 in the imaging system 22 of FIG. 2. This broad bandwidth may be utilized in conventional spatial filtering techniques such as that shown in FIG. 10 for enhancing the definition of an object, or alternatively may be utilized in the system of FIG. 8 as described hereinbefore.

Figure 11:
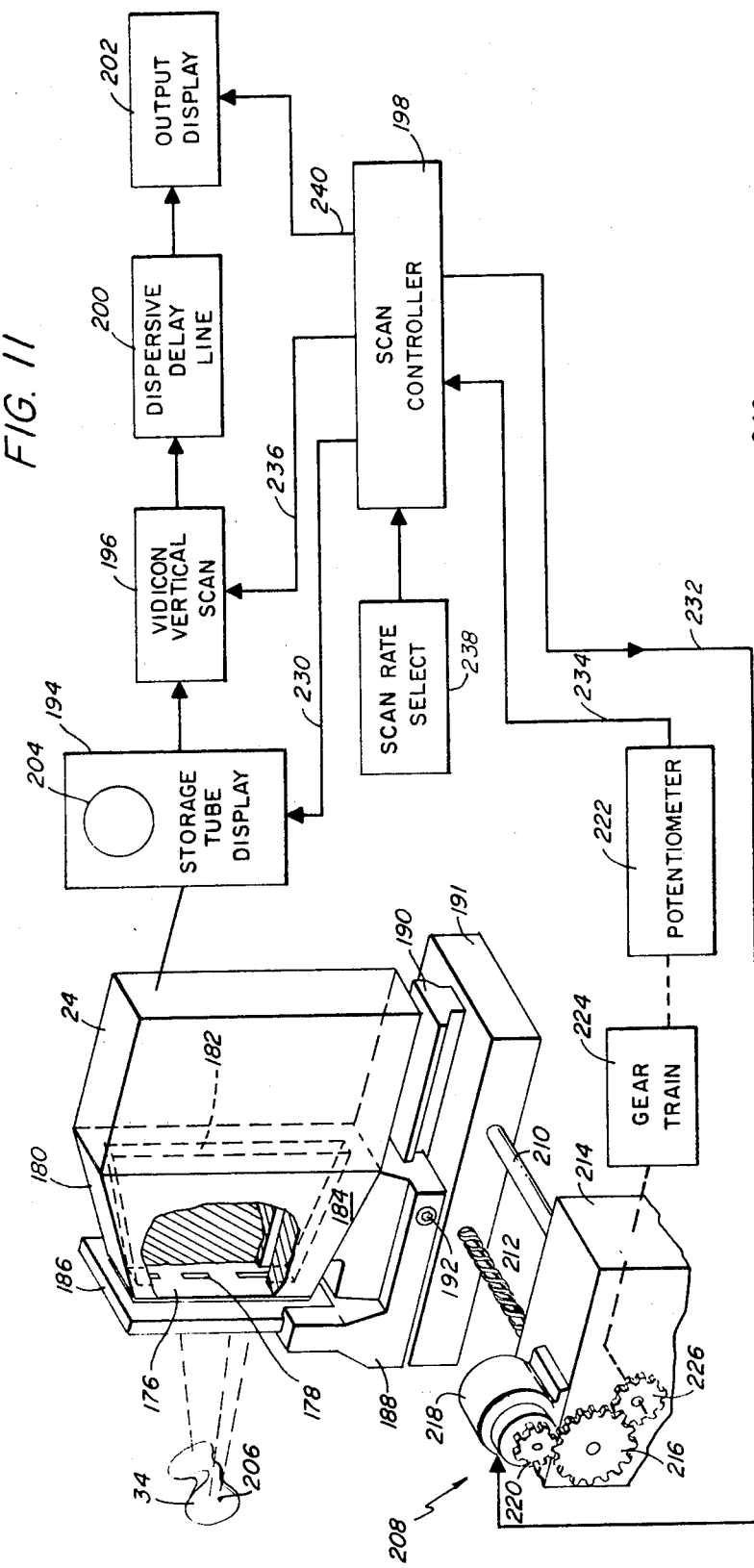
FIGS. 11 and 12 are diagrammatic views of alternative embodiments showing a mechanical scanner and an image intensifier.

Referring now to FIG. 11, there is shown an alternative embodiment of the imaging system of the invention wherein the scanning of the scrambled image on the face of the detector assembly 24 is accomplished in a two-step procedure in which the horizontal scanning is done mechanically and the vertical scanning is done electronically. In this embodiment the mask 30 of FIG. 2 is replaced with a mask 176 having a single column of apertures 178 which provides a scrambled image having a height similar to the height obtained with the embodiment of FIG. 2, but having a width which is sufficiently narrow so that the scrambled image approximates a line image. A collimator 180 comprising a single slot 182 cut within a lead block 184 is used to collimate the rays of radiation emanating from the object 34 so that only those rays within the column of apertures 178 can pass to the detector assembly 24. The mask 176 is mounted upon a substrate 186 similar to the rigid substrate 65 of FIG. 3. The collimator 180, the mask 176, and a mask substrate 186 are supported upon a movable rack 188 which is slidably mounted upon a track 190 affixed to a block 191 and tightened in position against the track 190 by means of set screw 192. The movable rack 188 is utilized to position the mask 176 and the collimator 180 for focusing the image of the object 34 in a manner similar to that described with reference to the embodiment of FIG. 2.

In the embodiment of FIG. 11 the detector assembly 24 and a storage tube display 194 function in the same manner as the detector assembly 24 and the first storage tube display 52 of FIG. 2. A vidicon 196 is programmed by a scan controller 198 to scan a single vertical line scan repetitively, rather than the sequence of horizontally displaced vertical line scans that is associated with a television raster type of scan. The output signal of the vidicon 196 is processed by a delay line 200 and subsequently displayed on an output display 202 in a manner similar to that described in FIG. 2 with reference to the second delay line 84 and the output display 28. Each point of the scrambled image of the line scan displayed on the storage screen 204 corresponding to a point, such as point 206, on the object 34 is compressed by the delay line 200 into a single point of the line displayed on the output display 202.

The mechanical scanning in the horizontal direction is accomplished by means of a mechanical scanner 208 comprising a rod 210, slidably mounted through the block 191 and a threaded rod 212, passing through a tapped hole in the block 191, which support the movable rack 188. The rod 210 and the threaded rod 212 are supported at their first ends by a mount 214 and at their opposite ends by a second mount, similar to mount 214 but not shown in the Figure. The threaded rod 212 is journalled in the mount 214 and passes through the mount 214 to make contact with a gear 216 by which the threaded rod 212 is rotated in the manner of a worm drive to impart a horizontal displacement in the position of the block 191 in accordance with the amount of rotation of the threaded rod 212 and the gear 216. The gear 216 is driven by a motor 218 through a pinion 220 mounted on the shaft (not shown) of the motor 218 and meshing with the gear 216. The motor 218 is a well known form of electric motor, such as a shunt wound motor, wherein the direction of rotation of the motor shaft can be varied electrically, as for example, by reversing the direction of current which energizes the rotor winding while retaining the direction of current which energizes the stator winding. In this way the movable rack 188 can be moved back and forth in the horizontal direction.

An electrical signal representing the position of the block 191 is provided by a potentiometer 222 mechanically connected to gear 216 via a gear train 224, indicated diagrammatically in FIG. 11, having a pinion 226 which meshes with the gear 216. In this way rotation of the potentiometer shaft (not shon) is proportional to the rotation of the threaded rod 212 and, therefore, to the displacement of the block 191.

The horizontal and vertical scanning are coordinated by means of the scan controller 198 which provides a signal along line 230 to the storage tube display 194 for erasing the line image on the storage screen 204 after each vertical scan of the vidicon 196 so that a new scrambled image in the form of a vertical line on the storage screen 204 can be composed for each position of the block 191. The output display 202 has a storage screen to permit direct viewing of the information provided by the successive line scans. The mechanical scanner 208 is driven in response to signals along line 232 provided by the scan controller 198. Signals from the potentiometer 222 representing the position of the block 191 are transmitted to the scan controller 198 along line 234. Each line scan by the vidicon 196 is provided in response to a signal on line 236 from the scan controller 198. The scanning rate is selected by means of a rate selector 238 which connects with the scan controller 198 and functions in a manner similar to that shown in FIG. 2 with reference to the rate selector 112 for focusing the imaging system.

The output display 202 employs a well known cathode ray tube (not shown) for displaying an image of the object 34. Deflection signals for the cathod ray tube of the output display 202 are provided in accordance with signals from the scan controller 198 along line 240. The vertical deflection signals for the output display 202 correspond to the vertical deflection signals of the vidicon 196, and the horizontal deflection signals for the output display 202 correspond to the signals along line 234 from the potentiometer 222.

It should be noted that the image displayed on the output display 202 of FIG. 11 differs from that displayed by the output display 28 of FIG. 2 in that the output display 28 provides compression in two dimensions while the output display 202 of FIG. 11 provides an image which is compressed in only the vertical direction. Compression in the vertical direction, only, has occured by virtue of the fact that the mask 176 of FIG. 11 provides only a single column of apertures 178, while the imaging system 22 of FIG. 2 the mask 30 has a two-dimensional array of both columns and rows of apertures 32.

Figure 12:
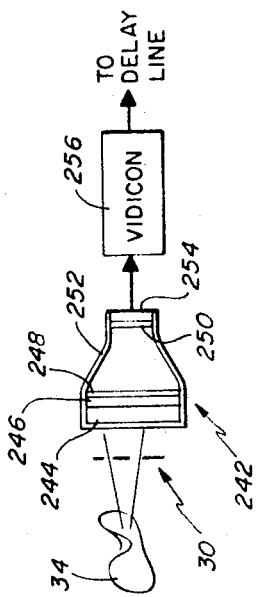

Referring now to FIG. 12 there is shown an alternative embodiment of the imaging system of FIG. 2 wherein the detector assembly 24 and the first storage tube display 52 are replaced by an image intensifier 242 comprising a scintillator 244, a glass plate 246 contiguous to the scintillator 244 and supporting a photocathode 248 in the form of a thin film, and an anode 250 which are enclosed by an envelope 252 for maintaining a vacuum between the photocathode 248 and the anode 250. A difference of potential is maintained between the photocathode 248 and the anode 250 by a suitable voltage source (not shown). Electrons emitted by the photocathode 248 are focused by suitable means, such as a well known magnetic deflection system (not shown) concentric to the envelope 252 for providing an image on a screen 254.

The object 34 and mask 30 are positioned in front of the image intensifier 242. In response to radiation emitted by object 34 and passing through apertures 32 in mask 30 to the scintillator 244, the scintillator 244 emits optical photons which interact with the photocathode 248 causing it to emit electrons. The sites on the photocathode 248 from which the electrons emanate correspond to the sites on the scintillator 244 at which high energy photons from object 34 impact. Accordingly, the image on the screen 254 has the same form as the image appearing on the first storage screen 54 of FIG. 2. The screen 254 is then scanned by vidicon 256 in the same manner as the storage screen 54 of FIG. 2 is scanned by the first vidicon 60. The remainder of this alternative embodiment of the imaging system is the same as that of the imaging system 22 of FIG. 2 and is therefore not shown in FIG. 12.

It is understood that the above described embodiments of the invention are illustrative only and that modifications thereof will occur to those skilled in the art. Accordingly, it is desired that this invention is not to be limited to the embodiments disclosed herein, but is to be limited only as defined by the appended claims.

What is claimed is:

1. In combination:
means for spatially distributing sequentially occurring quanta of radiant energy in a coded format, said distribution having a succession of first regions and a succession of second regions, the transmissivity of said second regions to said radiant energy being less than the transmissivity of said first regions to said radiant energy, said first regions being interspersed among said second regions and being arranged in accordance with said format;
means responsive to said quanta of radiant energy for providing signals having information relative to the locations of said quanta of radiant energy, said signal providing means including means for converting radiant energy into energy carried by electronic charges;
said signal providing means being spaced apart from said distributing means such that quanta of radiant energy emanating from loci which are spaced apart and equidistant from siad said distributing means can impinge upon a single point of said signal providing means; and
means having information relative to said format for decoding said signals to extract therefrom information relative to locations of points of emanation of said quanta of radiant energy.

2. The device as defined by claim 1 wherein said decoding means provides an image and comprises:
means for scanning the information of said signals, said scanning means providing a time modulated signal in response to the locations of said quanta; and
means for filtering said time modulated signal to provide a point of said image.

3. The device as defined by claim 2 further comprising:
means responsive to said filtering means for displaying said point of said image; and
means for coordinating said display means with said scanning for positioning said point within said image.

4. In combination:
means responsive to quanta of radiant energy emitted sequentially from a source of such radiant energy, said means inhibiting the passage of such ones of said quanta being emitted in any one of a plurality of predetermined directions, said means permitting the passage of at least some of said quanta of radiant energy emitted from said source in other predetermined directions, said means being further structured for providing a sequence of regions of inhibited passage and a sequence of regions of permitted passage of quanta of radiant energy, said regions of inhibited passage and permitted passage varying in size in accordance with a predetermined spatial code;
means including scintillation means for detecting the presence of such ones of said quanta of radiant energy which have passed through said impeding means, said detecting means providing signals having information relative to the locations of such quanta;
said detecting means and said inhibiting means being positioned relative to each other and relative to said source such that quanta of radiant energy emitted from separate points of said source and passing through separate ones of said regions of permitted passage can impinge upon a single point of said detecting means; and
means responsive to said signals of said detector means for decoding said information to provide an image of said source of radiation.

5. In combination:
means for illuminating an object with quanta of radiant energy, said means having regions of emission of said radiant energy interspersed among regions of non-emission, said regions of emission being arranged in a spatially coded pattern, said means being positioned relative to said object to permit quanta of radiant energy from different ones of said emissive regions to impinge upon a single point of said object;
means responsive to the transmissivity of said object to said radiant energy for detecting radiant energy transmitted through said object, said detecting means providing information relative to the locations of such ones of said quanta of radiant energy arriving at said detecting means within a predetermined interval of time; and
means responsive to said information of said detecting means for decoding said spatially coded pattern to provide an image of said object.

6. In combination:
means responsive to rays of radiation emitted from an object having sources of such radiation for modulating said radiation while retaining the directions of said rays, said means comprising an array of radiation transmissive regions interspersed among relatively opaque regions, said transmissive regions being arranged in accordance with a predetermined format;

means for detecting said modulated radiation, said detecting means being positioned relative to said modulating means such that one of said rays of radiation transmitted via one of said transmissive regions and a second of said rays of radiation transmitted via a second of said transmission regions can impinge upon a single point of said detecting means, said detecting means providing a signal having information relative to said format and to the locations of such ones of said rays of radiation which pass through said transmissive regions; and means for correlating said first signal with the arrangement of said transmissive regions in said predetermined format to provide an image of said object, said correlating means including means for scanning said detector signal and means for filtering the output of said scanning means, said filtering means being frequency dispersive.

7. The device defined by claim 6 wherein said correlating means further comprises:

means for generating a second signal which is modulated with said information relative to said format and further modulated with said information relative to said rays of radiation; and second means for providing a filtering function and filtering said detector signal, said second filtering means having a temporal weighting function complementary to the arrangement of said transmissive regions in said format for providing an image of said object.

8. In combination:

means responsive to the energy of particles moving along substantially linear paths for modulating the intensity of said particles, said modulating means comprising an array of barrier elements having predetermined sizes and being arranged in a predetermined format;

means for detecting selected ones of said particles which pass between said barrier elements to provide a signal having information relating to the locations of said selected particles, said detecting means being spaced from said modulating means to permit particles moving along a pair of said paths disposed on opposite sides of a barrier element to impinge on a single point of said detector means; and means for comparing said signal with said format to extract said information for forming an image.

9. An imaging system responsive to radiation emitted from an object, said imaging system comprising:

means for spatially modulating said radiation while retaining the direction of rays of said radiation, said moduating means comprising an array of radiation transmissive regions having differing sizes and arranged in a predetermined configuration;

means responsive to said spatially modulated radiation for forming a first image having information relative to said object and relative to said predetermined configuration, said first image forming means being positioned relative to said modulating means such that one of said rays passing through one of said transmissive regions and a second of said rays passing through a second of said transmissive regions can impinge upon a single point of said first imaging forming means;

a delay medium; and means for transmitting portions of said first image through said delay medium, said delay medium imparting to each of said portions a differential delay complementary to a corresponding portion of said predetermined configuration for providing said information relative to said object.

10. The system as defined by claim 9 further comprising means responsive to said transmission means for displaying an image of said object.

11. The system as defined by claim 10 wherein said transmission means comprises:

means for scanning said first image to provide a time modulated signal containing information relative to said predetermined configuration; and wherein said delay medium comprises means for generating surface waves.

12. The system as defined by claim 11 wherein said modulating means further comprises means for impeding radiation having an energy lower than a preset magnitude.

13. An imaging system comprising:

a source emitting radiation for illuminating an object, said source being adapted to provide said radiation with a spatially modulated pattern, said source having a series of spaced apart luminous regions each of which is positioned for illuminating a common point on said object;

means responsive to said spatially modulated radiation for forming a first image having information relative to said object and relative to said pattern;

a delay medium; and means for transmitting portions of said first image through said delay medium, said delay medium imparting to each of said portions a differential delay inverse to a corresponding portion of said pattern for providdng said information relative to said object.

14. The system as defined by claim 13 further comprising means responsive to said transmission means for displaying an image of said object.

15. The system as defined by claim 14 wherein said transmission means comprises:

means for scanning said first image to provide a time modulated signal containing information relative to said pattern; and wherein said delay medium comprises means for generating surface waves.

16. An array of regions each of which comprises a radiation emissive material and has a predetermined size, each of said regions being spaced apart such that each of said sizes and each of said spacings have preselected magnitudes for providing a predetermined spatial frequency characteristic, and means for positioning each of said regions in said array, a plurality of regions of said array of regions being arranged in a sequence according to the magnitudes of their sizes and their spacings ordered by monotonically increasing magnitudes to provide said spacial frequency characteristic with a characteristic of a chirp wave form.

17. In combination:

means responsive to rays of radiation emitted from an object having sources of such radiation for modulating said radiation with a spatial pattern while retaining the directions of said rays, said means comprising an array of radiation transmissive regions illuminated by said radiation and interspersed among relatively opaque regions, said transmissive regions being configured and arranged in accordance with a predetermined format such that said spatial pattern contains information relative to said format; and means responsive to the locations of said modulated rays of radiation for correlating said modulated rays with said format to derive an image of said object, said correlating means being positioned relative to said modulating means such that one of said rays passing through one of said transmissive regions and a second of said rays passing through a second of said transmissive regions can impinge upon a single point of said correlating means.

18. The device as defined by claim 17 wherein said correlating means comprises means for varying said responsivity in accordance with the spacing between said object and said modulating means whereby said device is focused.

19. In combination:

means responsive to rays of radiation emitted from a source of radiation for modulating said radiation, said means comprising an array of radiation transmissive regions interpersed among relatively opaque regions, said transmissive regions being arranged in accordance with a predetermined format;

means including scintillation means for detecting said modulated radiation for providing a signal having information relative to said format and to the locations of such ones of said rays of radiation which pass through said transmissive regions;

said detecting means being spaced apart from said modulating means to permit rays of radiation passing through noncontiguous ones of said transmissive regions to impinge upon a common point of said detecting means; and means for correlating said signal with said predetermined format to provide the direction of said source.

20. In combination:

means responsive to the energy of particles emanating from a source of such particles and moving along substantially linear paths for modulating the energy of said particles, said modulating means comprising an array of barrier elements having predetermined sizes and being arranged in a predetermined format;

means for detecting selected ones of said particles which pass between said barrier elements to provide a signal having information relating to the locations of said selected particles, said barrier elements being spaced from said detecting means to permit particles traveling on opposite sides of one of said barrier elements to impinge upon a common point of said detecting means; and means for comparing said signal with said format to extract said information to provide the direction of said source.

21. In combination:

means for modulating the spatial distribution of quanta of radiant energy illuminating an object, said spatial modulation having a predetermined format;

means responsive to the locations of quanta of radiant energy for receiving said quanta of radiant energy, said receiving means preserving information relative to said locations; and means for filtering said received radiant energy concurrently with the reception of quanta of radiant energy by said receiving means, the impulse response function of said filtering means having a format complementary to said spatial modulation format for providing information relative to said object.

22. A scanning system comprising:

means for modulating the distribution of radiant energy emanating from an object, said modulating means having a succession of radiation transmissive regions of differing sizes, said radiation transmissive regions being arranged in a sequence of monotonically increasing sizes in a first direction and in a second direction;

means for detecting said quanta of radiant energy, said detecting means providing an electrical impulse in response to the reception of a quanta of said radiant energy, said detecting means being spaced apart from said modulating means to permit radiant energy passing through different ones of said transmissive regions to impinge upon a common point of said detecting means;

means for storing said impulses, said storage means preserving data relative to the locations of the received quanta of radiant energy;

means for filtering the data in said storage means, said filtering means having a phase characteristic which is the inverse of the spatial modulation format of one of said sequences of transmissive regions;

second storage means for receiving data from the filtering means;

second filtering means for filtering the data in said second storage means, said second filtering means having a phase charactertistic which is inverse to that sequence of said transmissive regions in a second direction; and means responsive to the data filter by said first filtering means and the data filtered by said second filtering means for providing image points of said object in a first direction and in a second direction.

23. The scanning system of claim 22 wherein said first filtering means includes means for scanning said first storage means in accordance with a predetermined format.

24. The scanning system in accordance with claim 23 wherein said filtering means comprises a surface wave delay line.

25. The scanning system in accordance with claim 24 wherein said first storage means comprises a storage tube display.

26. The scanning system in accordance with claim 25 wherein said scanning of said first storage means provides a chirped frequency signal to said first filtering means.

27. A scanning system comprising:

means for placing a source of radiant energy in an object to be scanned;

means for detecting said radiant energy;

means interposed between said object and said detecting means for casting a shadow of said radiant energy upon said detecting means, said shadow comprising a plurality of shaded regions varying in size and position in accordance with a predetermined format;

said shadow casting means being spaced from said detecting means such that a second source of radiant energy located alongside the aforesaid source of radiant energy casts a second shadow comprising a plurality of shaded regions which overlap the shaded regions of the aforesaid shadow;

means coupled to said detecting means for storing data relative to the configuration of said shadow; and means for processing said stored data while said radiant energy is incident upon said detecting means, said processing means providing data relative to the form of said object.

28. In combination:

an array of sources of radiant energy positioned to illuminate an object, said sources having differing sizes and being arranged in a predetermined format;

means for detecting quanta of said radiant energy, said detecting means being positioned relative to said object such that radiant energy from a plurality of said sources can impinge upon a common point of said object and in passing by said object is incident upon said detecting means, said detecting means providing data relative to the spatial positions of such ones of said quanta of radiant energy which are incident upon said detecting means; and means for filtering the data provided by said detecting means, said filtering means having a phase characteristic functionally dependent upon said format to provide data relative to the form of said object.

29. In combination:

means for altering the spatial distribution of gamma rays, said gamma rays being utilized for illuminating an object, said altering means comprising a succession of radiation transmissive regions dispersed among regions of relative opacity to gamma rays, said transmissive regions being arranged in a predetermined format, said transmissive regions having a depth smaller than the width of such regions;

means for detecting such ones of said gamma rays that pass through said altering means, said detecting means providing data relative to the locations of said gamma rays; and means for correlating said data with said format to provide information about said object.

30. A nuclear imaging system comprising:

means for altering the spatial distribution of radiation utilized for illuminating an object, said altering means comprising a succession of radiation transmissive regions interspersed among regions of relative opacity to said radiation, said transmissive regions being arranged in a predetermined format in the form of a chirp pattern in at least one dimension such that the transmissive regions are arranged according to size in a monotonically decreasing array;

means for detecting rays of said radiation that pass through said altering means, said detecting means including means for providing data relative to the locations upon said detecting means where individual rays of said radiation impinge; and means for correlating said data with said format to provide information about said object.

31. The nuclear imaging system in accordance with claim 30 wherein the format of said altering means includes a chirp pattern in a second dimension providing an array of radiation transmissive regions arranged according to size in a monotonically decreasing array.

32. The nuclear imaging system in accordance with claim 31 wherein:

the detecting means further comprises means for storing said data, said data being stored in the form of an array of points each of which represents the location of a point of impingement of a ray of radiation upon the detecting means; and wherein said correlating means comprises means for scanning the array of data points of said detecting means to provide a scan signal, said correlating means further comprising means for filtering said scan signal, the frequency bandwidth of said scan signal being related to the spacing between locations of said points of impingement of rays of radiation upon said detecting means, said filtering means enabling a focussing of said nuclear imaging system when the bandwidth of said scan signal approximates the bandwidth of said filtering means.

33. The imaging system in accordance with claim 32 further comprising means for varying said focus.

34. The imaging system according to claim 33 wherein said variable focus means comprises means for varying the scanning rate of said scanning means of said correlating means.

35. A nuclear imaging system comprising:

means for illuminating an object with radiation, said illuminating means comprising a succession of radiation emissive regions interspersed among regions of non-emission, said emissive regions being arranged in a predetermined format in the form of a chirp pattern in at least one dimension such that the emissive regions are arranged according to size in a monotonically decreasing array;

means for detecting rays of said radiation that pass from said illuminating means, said detecting means including means for providing data relative to the locations upon said detecting means where individual rays of said radiation impinge; and means for correlating said data with said format to provide information about said object.

36. The nuclear imaging system in accordance with claim 35 wherein the format of said illuminating means includes a chirp pattern in a second dimension providing an array of radiation emissive regions arranged according to size in a monotonically decreasing array.

37. The nuclear imaging system in accordance with claim 36 wherein:

the detecting means further comprises means for storing said data, said data being stored in the form of an array of points, each of which represents the location of a point of impingement of a ray of said radiation upon the detecting means; and wherein said correlating means comprises means for scanning the array of data points of said detecting means to provide a scan signal, said correlating means further comprising means for filtering said scan signal, the frequency bandwidth of said scan signal being related to the spacing between locations of said points of impingement of rays of said radiation upon said detecting means, said filtering means enabling a focussing of said nuclear imaging system when the bandwidth of said scan signal approximates the bandwidth of said filtering means; and wherein said nuclear imaging system further comprises means for varying said focus, said variable focus means comprising means for varying the scanning rate of said scanning means of said correlating means.

38. In combination:

means for spatially distributing quanta of radiant energy in a coded format, said distribution having a succession of regions of differing dimensions, said regions having differing amounts of said quanta; and means responsive to said quanta of radiant energy for providing signals having data relative to the locations of said quanta of radiant energy, said signal providing means including means for converting radiant energy into energy carried by electronic charges, and said signal providing means being spaced from said distributing means to permit quanta of radiant energy emanating from points disposed at differnt angular orientations to said signal providing means to impinge upon a common point of said signal providing means.

39. The combination according to claim 38 further comprising means coupled to said signal providing means for storing said signals, and means for focussing said signal providing means.

40. The combination according to claim 39 further comprising means for extracting data from said storage means, said extracting means including means for filtering said data, said filtering means having a filter characteristic complementary to said spatial distribution.

41. In combination:

means responsive to a spatial distribution of quanta of radiant energy for providing a transform domain representation of an image, said means providing signals having data relative to the locations of said quanta radiant energy and including means for converting radiant energy into energy carried by electronic charges suitable for electronic amplification; and means responsive to said signals for decoding said spatial distribution to extract data from said signals, said data being suitable for forming an image.

42. The combination according to claim 41 further comprising means for storing said signals.

43. The combination according to claim 42 further comprising means for extracting data from said storage means, said extracting means including means for filtering said data, said filtering means having a filter characteristic complementary to said spatial distribution, and means for scanning said signal providing means.

* * * * *

UNITED STATES PATENT OFFICE
CERTIFICATE OF CORRECTION

Patent No. 3,748,470   Dated July 24, 1973

Inventor(s) Harrison H. Barrett

It is certified that error appears in the above-identified patent and that said Letters Patent are hereby corrected as shown below:

Column 1, line 34, after "provides" insert -- a system --.

Column 1, line 52, change "marks" to -- masks --.

Column 3, line 27, change "edge" to -- image --.

Column 4, line 22, change "wit" to -- with --.

Column 4, line 34, change "travls" to -- travels --.

Column 4, line 56, change "provdie" to -- provide --.

Column 5, line 23, after "to" insert -- the --; after "form" insert -- of --.

Column 5, line 33, after "of" insert -- a --.

Column 6, line 31, change "te" to -- the --.

Column 6, line 65, delete "of" (second occurrence) and after "and" insert -- of --.

Column 8, line 45, change "wile" to -- while --.

Column 8, line 52, change "condiguration" to -- configuration --.

Column 9, line 1, change "95" to -- 97 --.

Column 9, line 22, change "at" to -- by --.

Column 9, line 54, change "which" to -- each --.

UNITED STATES PATENT OFFICE
CERTIFICATE OF CORRECTION

Patent No. 3,748,470  Dated July 24, 1973

Inventor(s) Harrison H. Barrett

It is certified that error appears in the above-identified patent and that said Letters Patent are hereby corrected as shown below:

Column 10, line 21, change "the" (second occurrence) to -- The --.

Column 11, line 9, change "therby" to -- thereby --.

Column 12, line 28, change "characterlstic" to -- characteristic --.

Column 16, line 43, change "cathod" to -- cathode --.

Column 16, line 60, after "while" insert -- in --.

Column 17, line 55, Claim 1, delete "siad".

Column 21, line 9, Claim 17, after "ject," insert -- said correlating means comprising frequency dispersive filtering means, --.

Column 22, line 38, Claim 22, change "charactertistic" to -- characteristic --.

Column 22, line 41, Claim 22, change "filter" (first occurrence) to -- filtered --.

Column 25, line 22, Claim 38, change "differnt" to -- different--

Column 26, line 12, Claim 41, after "quanta" insert -- of --.

Signed and sealed this 1st day of October 1974.

(SEAL)
Attest:

McC. M. GIBSON JR.
Attesting Officer

C. MARSHALL DANN
Commissioner of Patents